(12) United States Patent
Shepherd

(10) Patent No.: US 8,079,389 B2
(45) Date of Patent: Dec. 20, 2011

(54) VACUUM ATTACHMENT FOR ROUTER TABLE

(76) Inventor: Daryl E. Shepherd, Mays Landing, NJ (US)

( * ) Notice: Subject to any disclaimer, the term of this patent is extended or adjusted under 35 U.S.C. 154(b) by 211 days.

(21) Appl. No.: 12/654,364

(22) Filed: Dec. 17, 2009

(65) Prior Publication Data

US 2010/0186852 A1    Jul. 29, 2010

Related U.S. Application Data

(60) Provisional application No. 61/202,097, filed on Jan. 28, 2009.

(51) Int. Cl.
*B27G 21/00* (2006.01)
(52) U.S. Cl. .................. 144/252.1; 144/286.5
(58) Field of Classification Search .............. 144/252.1, 144/252.2, 286.1–287; 409/137; 408/67; 83/100
See application file for complete search history.

(56) References Cited

U.S. PATENT DOCUMENTS

| | | | |
|---|---|---|---|
| 2,100,566 A | 11/1937 | Munding | |
| 2,859,940 A * | 11/1958 | Brochetti | 175/209 |
| 3,022,806 A | 2/1962 | Johnston | |
| 4,088,164 A | 5/1978 | McCord, Jr. | |
| 4,184,226 A * | 1/1980 | Loevenich | 15/415.1 |
| 4,738,571 A | 4/1988 | Olson et al. | |
| D352,298 S | 11/1994 | Beisbier, Jr. | |
| 5,370,165 A | 12/1994 | Stornetta | |
| 5,556,243 A | 9/1996 | Bory | |
| 5,611,378 A | 3/1997 | Brazell | |
| 5,678,965 A | 10/1997 | Strick | |
| 5,993,124 A * | 11/1999 | Cooper et al. | 409/137 |
| 6,835,030 B2 * | 12/2004 | Pozgay et al. | 408/182 |
| 6,851,900 B2 | 2/2005 | Tillemans et al. | |
| 6,854,937 B1 | 2/2005 | Weiss | |
| 7,044,843 B1 | 5/2006 | Lin | |
| 7,114,538 B2 | 10/2006 | Rosendahl | |
| 7,905,260 B2 * | 3/2011 | Keenan | 144/252.1 |

FOREIGN PATENT DOCUMENTS

JP        3170250 A     7/1991

* cited by examiner

*Primary Examiner* — Shelley Self
(74) *Attorney, Agent, or Firm* — Richard C. Litman

(57) ABSTRACT

The vacuum attachment for a router table removes wood chips, dust, and debris during operation of the router. The attachment includes a hollow annular housing adapted for mounting about the router. The annular housing has an upper edge, a lower edge and at least one sidewall, with the upper and lower edges being adapted for sealing engagement with an external surface of the router. At least one vent hole is formed through the annular housing and a vacuum port is formed therethrough, so that a vacuum source connected to the vacuum port is in fluid communication with an interior of the annular housing. When the annular housing is mounted about the router and aligned with an opening in the base of the router, the vacuum source draws debris away from the router and the router table, with environmental air entering the interior through the vent holes.

5 Claims, 4 Drawing Sheets

VACUUM ATTACHMENT FOR ROUTER TABLE

CROSS-REFERENCE TO RELATED APPLICATION

This application claims the benefit of U.S. Provisional Patent Application Ser. No. 61/202,097, filed Jan. 28, 2009.

BACKGROUND OF THE INVENTION

1. Field of the Invention

The present invention relates generally to woodworking appliances, and more particularly to a vacuum attachment for a router table for collecting wood chips, dust, and other debris during operation of the router.

2. Description of the Related Art

A router is used to cut grooves into wood for ornamental and decorative purposes in articles, such as cabinets, doors and furniture. When a conventional router is used, a large amount of dust and chips are typically thrown from the router bit, through an exhaust opening, and into the surrounding environment.

A motor of the router pulls air through the router for cooling purposes. This necessary airflow, however, scatters chips and dust around the work area. The chips thrown from the router bit can be harmful to the operator, causing cuts and scrapes on the user's body, as well as allergic reactions if the operator is allergic to the type of wood.

In the past, it has been known to provide an attachment for the router that can perform the function of deflecting chips that are removed by the router bit from a surface of the work piece. Such attachments are typically positioned generally perpendicular to the rotational axis of the router bit. However, these deflecting guards tend to only scatter the chips, dust, and debris around the router table, rather than providing a dust, chip and debris-free environment.

Dust removal and collection systems have been devised for various types of power tools. However, an effective removal or extraction of the wood chips, debris, and dust when performing routing operations has posed a problem that has not been satisfactorily solved, especially when using a conventional table router. The conventional dust removal and collection systems tend to focus on the router table top, but neglect the area under the router table, where nearly all of the wood chips, debris, and dust fall. One reason for only focusing on the top of the router table is due to the mounting mechanisms of the router under the table. Where fixtures or handles are used for mounting the router, it is quite difficult to employ any type of removal or collection system during the operation of the router. Without a satisfactory system, the user must simply tolerate the wood chips, debris, and the dust throughout the entire usage of the router.

Thus, a vacuum attachment for a router table solving the aforementioned problems is desired.

SUMMARY OF THE INVENTION

The vacuum attachment for a router table is a debris-removing assembly for removing chips, dust, and other debris. The assembly is vertically disposed about a router spindle of a router mounted beneath a router table. The vacuum attachment for the router table includes a substantially C-shaped first portion, and a second, substantially semicircular portion releasably attached to the first portion to form an annular housing.

The second portion has an arcuate main portion and a tubular portion. The arcuate portion is substantially C-shaped, the tubular portion projecting outwardly therefrom. The tubular portion defines a vacuum port, and the annular housing is adapted for removable mounting about the router positioned beneath the router table.

The annular housing has an upper edge, a lower edge and at least one sidewall. The upper and lower edges are adapted for sealing engagement about the external surface of the router. At least one vent hole is formed through the annular housing. In use, an external vacuum source is connected to the vacuum port. The hollow interior of the annular housing is aligned with an opening in the base of the router so that debris falling below the router table into the router is drawn through the opening in the router base into the hollow annular housing and collected by the vacuum applied to the vacuum port. Environmental air enters the interior of the annular housing through the at least one vent hole to provide cooling.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
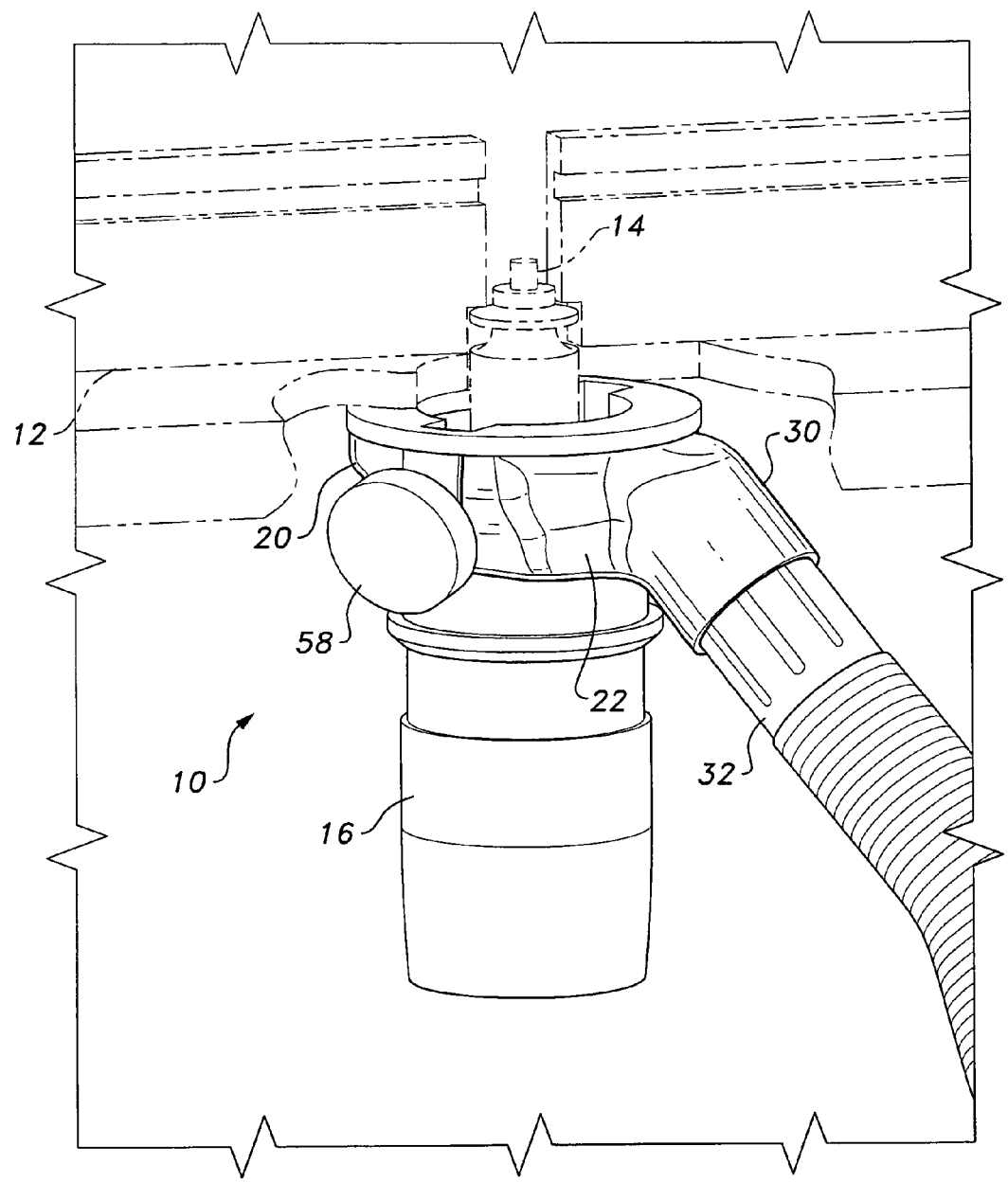
FIG. 1 is an environmental, perspective view of a vacuum attachment for a router table according to the present invention.

The vacuum attachment for a router table, illustrated in FIGS. 1-4, is a debris-removing assembly, generally indicated in the drawings as 10. The attachment 10 is utilized for removing wood chips, dust, and other debris when shaping wood on a router table 12. The attachment 10 is vertically disposed and concentrically aligned with a router spindle 14 of a router 16 mounted to the router table 12, as illustrated. It should be understood that attachment 10 may be used in combination with any suitable type of router or other woodworking tool, and router 16, along with router 12, are shown for exemplary purposes only.

Figure 2:
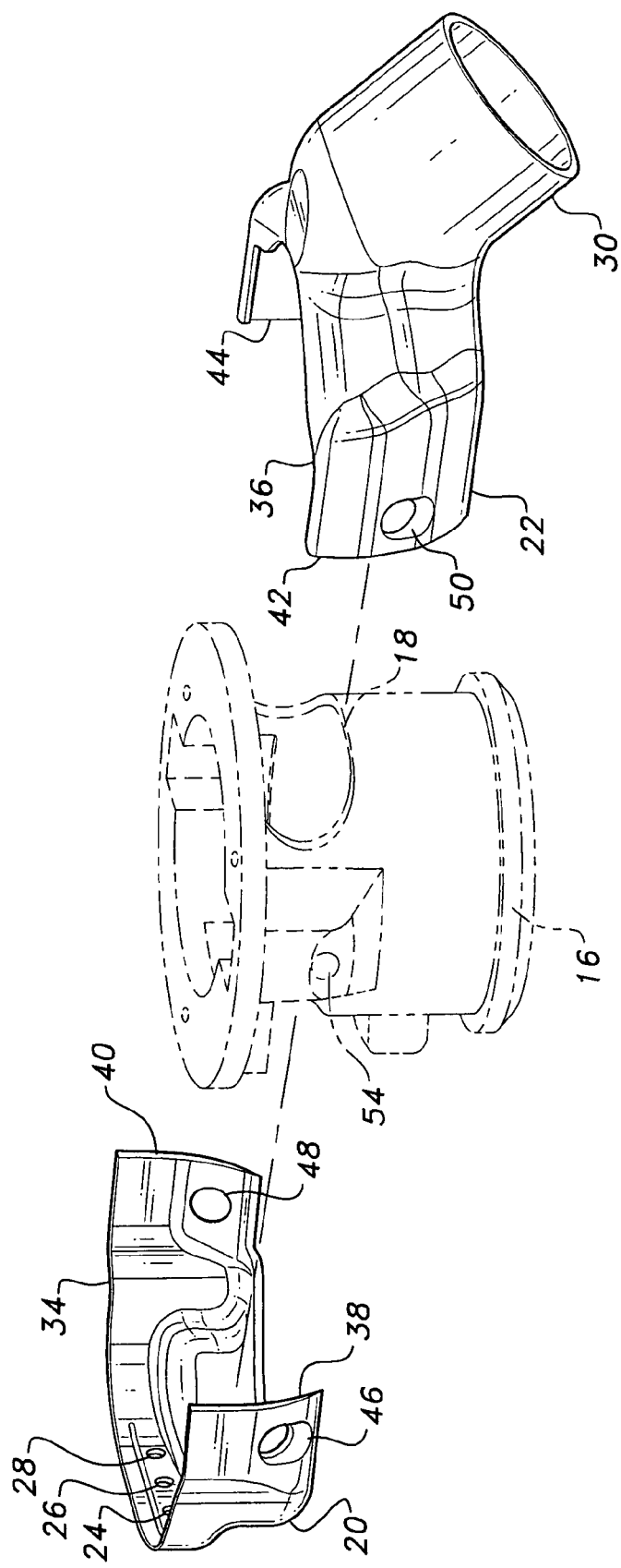
FIG. 2 is an exploded view of the vacuum attachment according to the present invention.

As best shown in FIG. 2, the attachment 10 covers and encloses a side opening 18 in the base of the router 16 when the router 16 is mounted below the router table 12, and when the router spindle 14 is oriented vertically upward, extending above the router table 12, as shown in FIG. 1 and as is conventionally known.

The attachment 10 is preferably formed from a molded plastic circular housing. As best shown in FIG. 2, the molded plastic housing includes two separate and distinct halves 20, 22. The first half 20 is substantially C-shaped. The second half 22 is substantially Y-shaped. The first half 20 is preferably formed as a semicircular vent piece, as shown, for receiving or permitting air to enter around the router 16. The vent half or piece 20 has a plurality of vent holes 24, 26, 28 formed therethrough. Although three circular vent holes are illustrated, it should be understood that any desired number of vent holes having any desired dimensions and configuration may be formed through piece 20.

The vent holes 24, 26, 28 permit air to be sucked into and around the router 16 from the external environment. As is conventionally known, routers, such as router 16, utilize driven environmental air for cooling. The second half 22 is a semicircular vacuum attachment piece having a tubular member 30 extending outwardly therefrom. As shown, the tubular member 30 is preferably angled downwardly at approximately 45° when the attachment 10 is attached to the router 16.

The tubular member 30 is provided for attachment to a hose 32, as shown in FIG. 1, or to any other tubular type of attachment from a vacuum source. Vacuum hose 32 may be attached to tubular member 30 by any suitable type of attachment, such as frictional engagement therewith, the hose 32 preferably being inserted within the tubular member 30. Frictional engagement of vacuum hose 32 with tubular member 30 is further enhanced when the external vacuum source is powered due to the suction caused by the vacuum source. The external vacuum source is used to draw the cooling environmental air through the vent holes 24, 26, 28.

Each of the halves 20, 22 is formed with substantially semicircular top edges 34, 36, as shown, which snuggly fit around the router 16. The top ends 34, 36 terminate in substantially linear or rectangular side edges 38, 40 and 42, 44, respectively.

Openings 46, 48 are formed through the first half 20, adjacent the side edges 38, 40, as shown. Similarly, openings 50, 52 are formed through the second half 22, adjacent the side edges 42, 44, as shown. Preferably, the openings 46, 48 and 50, 52 are formed symmetrically with respect to the respective half. Opening 52 is obscured by the main body of half 22 in FIG. 1, but is clearly shown in FIG. 3.

Figure 3:
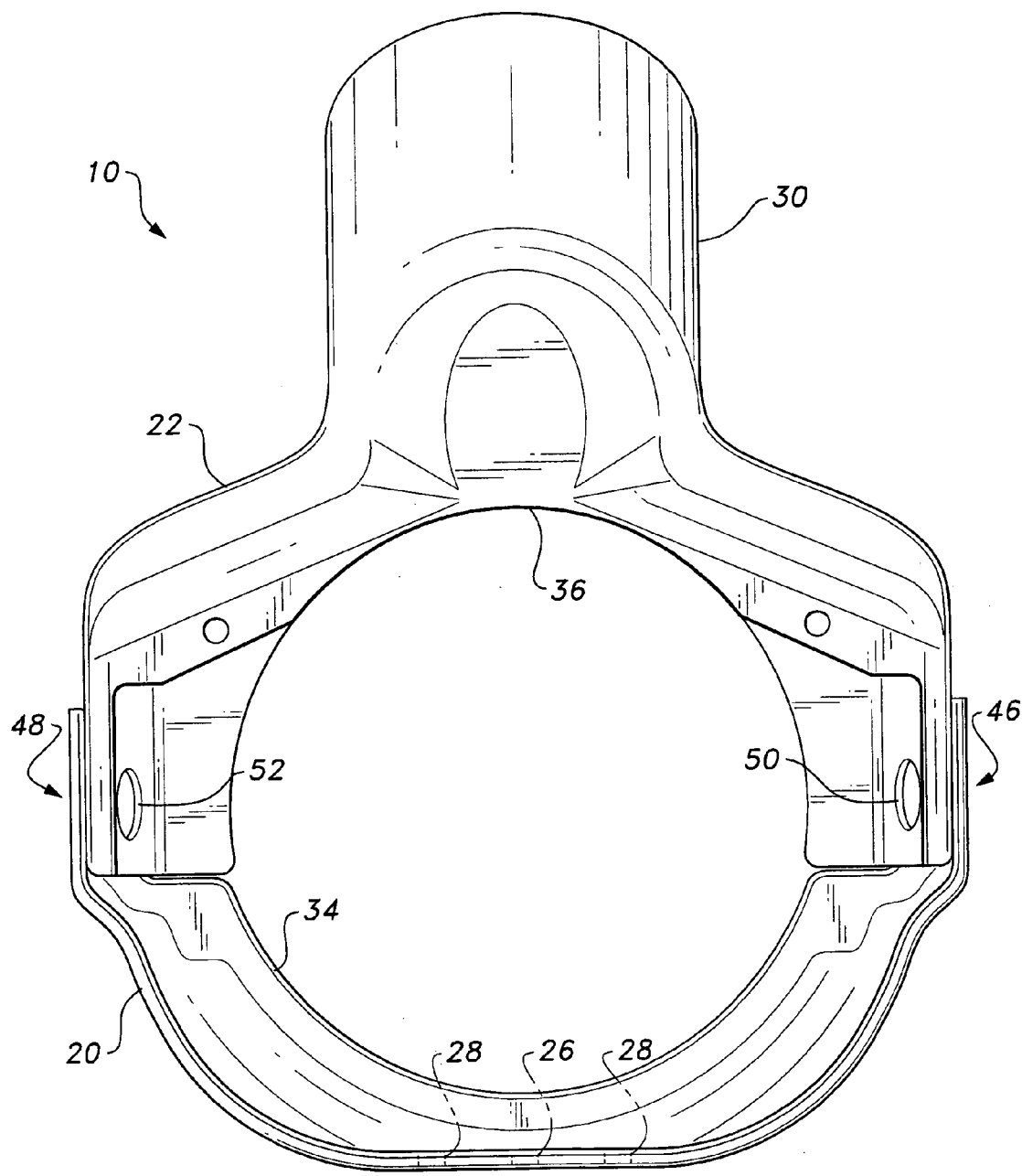
FIG. 3 is a top view of the vacuum attachment according to the present invention.
Figure 4:
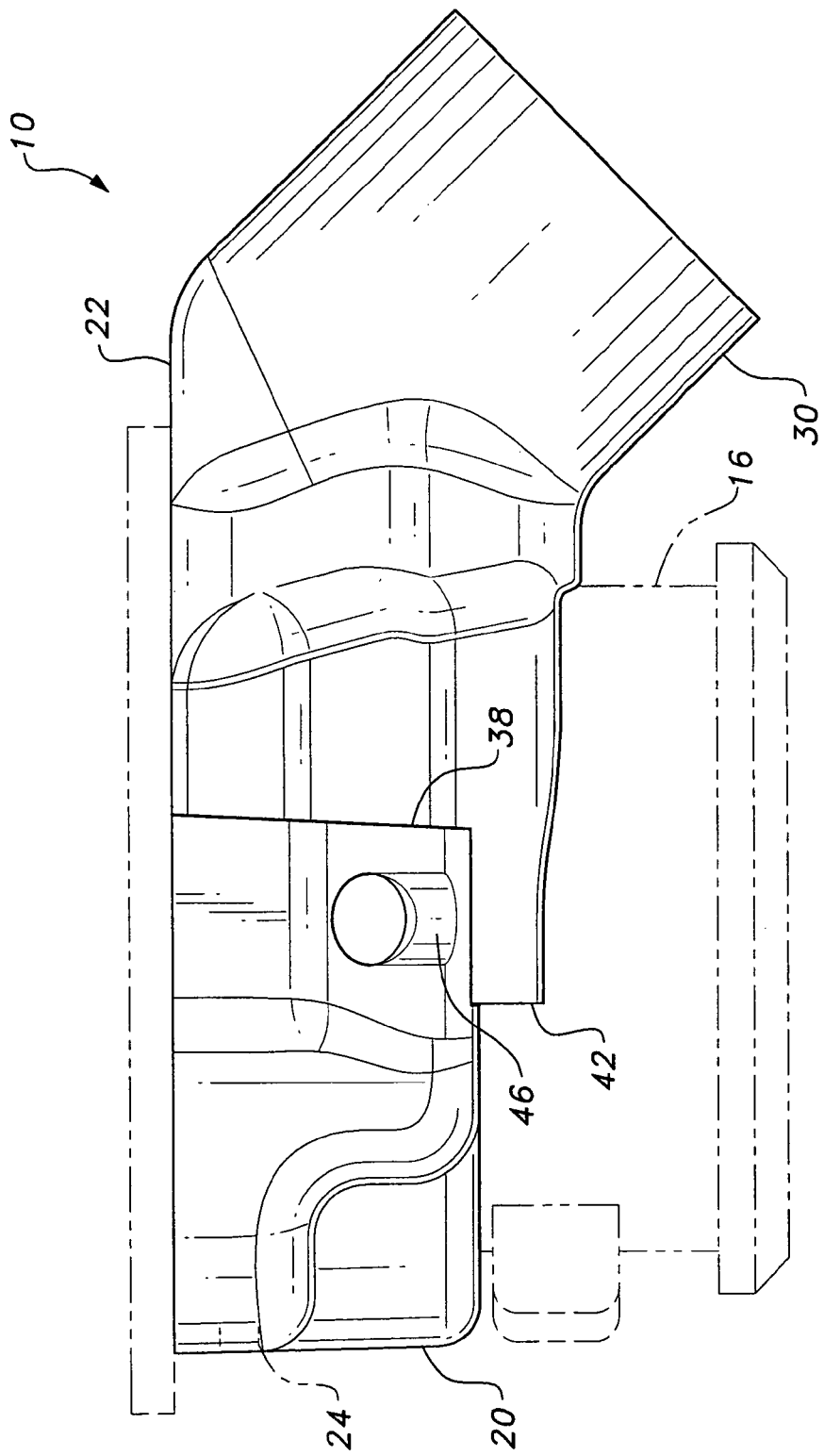
FIG. 4 is side view of the vacuum attachment according to the present invention.

Each of the openings 46, 48 and 50, 52 respectively align with one another when they are positioned to fit over each post 54 of the router 16; i.e., router 16 has a pair of diametrically opposed posts 54 projecting outwardly therefrom and, as best shown in FIG. 3, halves 20, 22 are brought together such that one post may project through opening 48 and opening 52, and the other post may project through opening 46 and opening 50. In this configuration, the rectangular edges 38, 40 of the vent piece 20 slightly jut or extend out to overlap the respective rectangular edges 42, 44 of the vacuum piece 22, as shown in FIG. 3.

Once the halves 20, 22 are mounted on the respective posts 54 of the router 16, mounting handles 58 of the router 16 are used to attach the attachment 10 to the router 16 underneath the router table 12. In FIGS. 1 and 2, only one post 54 is shown, and only one handle 58 is shown. It should be understood that a respective post 54 is positioned diametrically opposite the router 16, and one handle 58 is mounted on this opposite post. In this attached state, the attachment 10 can begin to collect the chips and the dust during use of the router 16 and the vacuum source under the router table 12. Chips, dust and debris that fall below the table are collected within the annular reservoir defined by the interior of halves 20, 22, and are drawn away by the external vacuum source through vacuum tube 32, which is attached to tubular member 30. Thus, the attachment 10 is able to effectively remove the dust, chips and other debris that fall below the table.

It is to be understood that the present invention is not limited to the embodiment described above, but encompasses any and all embodiments within the scope of the following claims.

I claim:

1. A vacuum attachment for a router table, comprising a hollow annular housing adapted for being mounted about a router positioned beneath a router table, the annular housing having:
   a) an upper edge, a lower edge and at least one sidewall, the upper and lower edges being adapted for sealing engagement with an external surface of the router;
   b) at least one vent hole and a vacuum port formed therein;
   c) first and second portions releasably attached to one another, wherein the first portion is substantially C-shaped and the second portion has an arcuate portion and a tubular portion, the arcuate portion being substantially C-shaped and the tubular portion projecting outwardly therefrom, the tubular portion defining the vacuum port, wherein each of said first and second portions includes:
      i) a pair of diametrically opposed side edges; and
      ii) a pair of side openings formed therein, the openings being formed adjacent each of the side edges, respectively, the side openings being adapted for receiving a pair of engaging posts formed on the router, whereby the first and second portions are releasably locked together to form the annular housing when the respective side openings of the first and second portions are aligned and positioned on the pair of engaging posts,
   whereby an external vacuum source connected to the vacuum port collects dust and debris falling below the table into the router when the hollow annular housing is attached to the router and aligned with an opening in the base of the router, environmental air entering the annular housing through the at least one vent hole to cool the router.

2. The vacuum attachment for a router table as recited in claim 1, wherein the vacuum port of the tubular portion is adapted for receiving a free end of a vacuum hose of the external vacuum source, the free end being releasably secured therein.

3. The vacuum attachment for a router table as recited in claim 2, wherein the vacuum port is adapted for frictionally engaging the free end of the vacuum hose.

4. The vacuum attachment for a router table as recited in claim 1, further comprising a pair of handle members for respective mounting on the pair of engaging posts for releasably securing the annular housing to the router.

5. A vacuum attachment for a router table, comprising a hollow annular housing adapted for being mounted about a router positioned beneath a router table, the annular housing having:
   a) an upper edge, a lower edge and at least one sidewall, the upper and lower edges being adapted for sealing engagement with an external surface of the router;
   b) at least one vent hole and a vacuum port formed therein;
   c) first and second portions releasably attached to one another, wherein the first portion is configured to engage and fit about a portion of the router and the second portion having a configured portion and a tubular portion, the configured portion being sized and shaped to engage and fit about a portion of the router and the tubular portion projecting outwardly therefrom, the tubular portion defining the vacuum port, wherein each of said first and second portions includes:
      i) a pair of diametrically opposed side edges; and
      ii) means for attaching the side edges to corresponding structure formed on the router, whereby the first and second portions are releasably locked together to form the annular housing when the respective attaching means of the first and second portions are aligned and positioned on the corresponding structure on the router, whereby an external vacuum source connected to the vacuum port collects dust and debris falling below the table into the router when the hollow annular housing is attached to the router and aligned with an opening in the base of the router, environmental air entering the annular housing through the at least one vent hole to cool the router.

\* \* \* \* \*